United States Patent

[11] 3,611,123

[72] Inventors Robert B. Mouw
Sherman Oaks;
Franklin S. Coale, Pasadena, both of Calif.
[21] Appl. No. 827,635
[22] Filed May 26, 1969
[45] Patented Oct. 5, 1971
[73] Assignee Systron-Donner Corporation
Concord, Calif.

[54] LOW INSERTION LOSS DIRECTIONAL DETECTOR
7 Claims, 8 Drawing Figs.

[52] U.S. Cl. ..................................... 324/57 R,
324/95, 333/81
[51] Int. Cl. ..................................... G01r 27/00
[50] Field of Search.......................... 324/57, 58, 95; 333/81

[56] References Cited
UNITED STATES PATENTS
2,884,606 4/1959 Stevens ..................... 333/81

*Primary Examiner*—Edward E. Kubasiewicz
*Attorney*—Flehr, Hohbach, Test, Albritton & Herbert ABSTRACT: The directional detector includes input and output terminals connected by a bridge resistance $R_1$. A pair of diagonal resistances $R_2$, $R_3$ having the same impedance as the transmission line to which the device is connected are connected to a common node and across to each of the input and output terminals respectively. A third resistance $R_4$ is connected from the common node to ground node which also connects the ground side of the input and output terminals. The resistances $R_1$ and $R_4$ are related by the equation $Z_o^2 = R_1 R_4$. Otherwise, $R_1$, $R_4$ can be chosen arbitrarily to provide specified insertion insertion loss and attenuation. A detecting element is connected in parallel across one of the diagonal resistors for providing a voltage indication of power reflected into the node to which that diagonal resistance is connected, either input or output. Typically, the detecting element is a high frequency, high-impedance diode connected in series with a resistance and DC blocking capacitor to provide enhanced flat frequency response over a wide bandwidth. Another embodiment of the invention utilizes printed circuit techniques in stripline to obtain higher frequency of operation.

DETECTOR
OUT

INVENTOR.
Robert B. Mouw
BY Franklin S. Coale
Flehr, Hohbach, Test,
Albritton & Herbert
Attorneys INVENTOR.
Robert B. Mouw
Franklin S. Coale
BY
Flehr, Hohbach, Test,
Albritton & Herbert
Attorneys

LOW INSERTION LOSS DIRECTIONAL DETECTOR

BACKGROUND OF THE INVENTION

This invention relates to directional detectors which serve to provide an output voltage which is selectively responsive to power flowing in a predetermined direction through the device. Such devices are useful in measuring impedance match of loads to power sources. Particularly important application is in the measurement of power matching of a transmitting antenna to its transmitter where mismatch results in reflected power from the antenna.

Heretofore, directional detectors have been limited in their usefulness due to limited bandwidth of operation, design limited attenuation factors, and high cost. Many devices were not bilateral and could not be simultaneously matched both to load and source. There is, therefore, a need for a new and improved directional detector.

SUMMARY OF THE INVENTION AND OBJECTS

In general, the object of the present invention is to provide a directional detector which will overcome the above limitations and disadvantages.

Another object of the invention is to provide a directional detector of the above character which has theoretically flat bandwidth characteristic from DC to microwave frequencies.

Another object is to provide a directional detector of the above character in which the attenuation of the device can be designed over a wide range of values, including those for which the insertion loss is negligible, i.e., less than about 0.05 db.

Another object is to provide a directional detector of the above character which is bilateral, permitting matched transmission of power through the device from a source to a load, and further, which is matched to reflections from the load to thereby obtain useful reflection measurements.

Another object of the invention is to provide a directional detector of the above character which can be used as a circuit for measuring the strength of transmitted power and which can therefore control the level of such power while simultaneously maintaining impedance match between the source of power and a load.

Another object of the invention is to provide a directional detector of the above character which is readily adapted for use with active components and certain portions thereof to thereby provide a wide variety of other useful, active devices.

Another object of the invention is to provide a directional detector of the above character in which a high attenuation factor can be selected without disturbing the matched condition of the detector with respect to source and load.

Another object of the invention is to provide a directional detector of the above character which lends itself to production by printed circuit techniques, such detector being particularly adapted for use in high frequencies.

Another object of the invention is to provide an exceptionally wide bandwidth, a directional detector which facilitates swept frequency measurement techniques on other devices while measuring the degree of match to such device as a function of frequency.

In accordance with the present invention, there is provided a suitable ground means for connecting together the ground sides of an input and output terminal. The terminals also have isolated nodes for being connected to transmission lines, or to a source and load. A bridge resistance $R_1$ is connected in series between the input and output terminal nodes. A pair of diagonal resistances $R_2$, $R_3$ having the same impedance as the transmission-line impedance or source and load impedance are connected to a third, common node, the other ends being connected to the input and output terminal nodes respectively. Third resistance $R_4$ connects the common node to ground. The resistances $R_1$, $R_4$ are related by the equation $Z_o^2 = R_1 R_4$. A detecting element is connected in parallel across one of the diagonal resistances for providing voltage indication of power reflected into the terminal node to which said one diagonal resistance is connected. A detector output terminal is provided and is connected to the output of said detecting element. Energy passing through the device in one direction is not detected while energy reflected in the reverse direction is detected by the detecting element to provide an output-voltage indication at the output terminal.

These and other features and objects of the invention will become apparent from the following description and claims when taken in conjunction with the accompanying drawings.

DETAILED DESCRIPTION OF THE PREFERRED EMBODIMENTS

Figure 1:
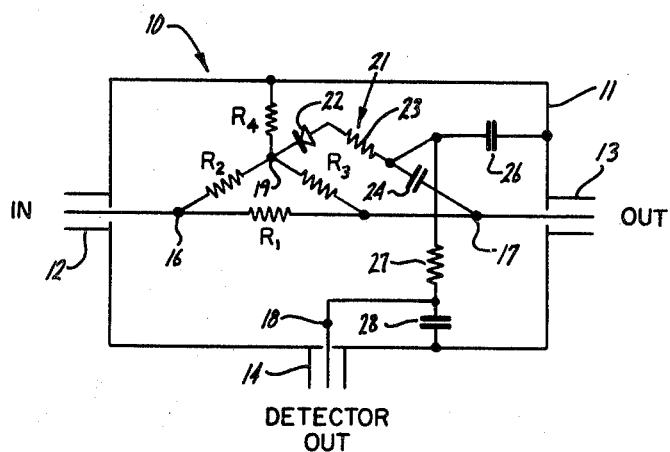
FIG. 1 is a circuit diagram of the frequency independent directional detector constructed in accordance with the present invention.

Referring to FIG. 1, there is shown one form of frequency independent directional detector 10 (FIDD) constructed in accordance with the present invention and generally consists of a box structure 11 which is made of conductive material and serves to support an input terminal 12, an output terminal 13 and a detector output terminal 14. All of the terminals are of coaxial type, their outer normally grounded portions of the structure being fastened to the box and serving thereby to utilize the conductivity of the box as a common ground connection between the terminals. Input terminal 12 has a center conductor therein which provides an input node 16. Similarly, the output terminal has a center conductor terminating in an output node 17. The detector output terminal is also of a coaxial form having a center conductor forming a detector output node connection 18. Typically, the conductive box structure is closed on all sides to provide shielding of the contained components from stray fields.

A bridge resistor $R_1$ is connected between the input node 16 and the output node 17. Diagonal resistors $R_2$, $R_3$ together with shunt resister $R_4$ form a Y-connection across bridge resistor $R_1$ to ground. Resistors $R_2$ and $R_3$, termed diagonal resistors, are connected to a common node 19 at one end and their other ends are connected to the input and output nodes 16 and 17, respectively. Resistor $R_4$ is connected from common node 19 to ground at a convenient location in the box. The resistance values of the diagonal resistances $R_2$ and $R_3$ are equal to each other and to the transmission line impedance in which the device is connected. For example, if the characteristic impedance of the associated transmission line is 50 ohms, then $R_2 = R_3 = 50$ ohms. A large degree of freedom is permitted with respect to the resistances $R_1$ and $R_4$. However, they must satisfy the relation that their product is equal to the characteristic impedance of the transmission line squared. Stated in a formula $Z_o^2 = R_1 R_4$. By varying the relative magnitudes of $R_1$ and $R_4$, the insertion loss and attenuation of the device is controlled.

A detection circuit 21 is connected in parallel across one of the diagonal resistors for providing a voltage indication of power reflected into that node to which that diagonal resistance is connected. As shown in FIG. 1, such a detection circuit can include a diode 22 connected at one end to common node 19 and through series-connected resistor 23 and capacitor 24 to the output terminal node 17. The diode is a normal, point-contact microwave detector diode which has a very high impedance and therefore behaves more as a voltage indicator rather than a current indicator. Its purpose is to monitor the voltage across the diagonal resistance $R_3$ without disturbing the circuit or changing its impedance values to any appreciable degree. The diode 22 together with the associated components 23, 24 serve to provide a voltage waveform which indicates the envelope of the waves or energy entering the node 17 to which it is connected.

The series resistance 23 connected to the diode aids in obtaining a flat response to frequency and is used to eliminate the tendency of the diode to have an output peak at the resonance frequency of its parasitics. If necessary, a small tuning capacitor 26 may be provided across ground to the connection between the resistance and the diode.

Capacitor 24 serves as a DC isolation capacitor for the detection circuit. Thus, the capacitor serves to keep DC voltage off of the transmission lines to which the device is connected, and also prevents severe attenuation of the diagonal resistor $R_3$ which would be connected in parallel with the diode from the DC standpoint, were it not for capacitor 24.

An isolation resistance 27 is connected in series with the output and is bypassed by capacitor 28 at the output side. Typically, the value of resistor 27 is quite high with respect to the impedance of the transmission lines to which the device is connected. By way of example, if the transmission line impedance is about 50 ohms, as is common, then the resistor 27 could be about 1,000 ohms. At such levels, the utility of external circuits is not impaired as resistor 27 prevents loading of the circuits and by virtue of its relatively high resistance, it approaches a theoretically open circuit so that no appreciable current is bypassed through the detection circuit.

In general, the function of the resistive network of the detector of the present invention is to provide a flat, matched network in which the signal passing in either direction between the input to the output is impedance matched provided the source and load or transmission lines to which the device is connected are matched. Under such conditions, signal entering the input passes through to the output without dissipation of power except for the power dissipated in $R_1$. The balance condition for $$Z_2 = Z_3 = Z_0$$

is $$R_1 R_4 = Z_0^2$$

and $R_1 R_4$ determine the attenuation through the network. It is possible to view this circuit as a special case of a particular form of wheatstone bridge and as such $R_3$ would represent the null arm. If the load and source are reversed with respect to the device, it then functions similarly to the bridged-T attenuator in which the insertion loss is $$20 \log_{10} \frac{R_1 + Z_0}{Z_0}.$$

Several detectors have been constructed in accordance with the above invention. By way of example, one unit had $R_2 = R_3 = 50$ ohms, $R_3 = 843.8$ ohms, and $R_1 = 2.96$ ohms. Its insertion loss was 0.5 db. DC isolation capacitor 24 was 1,000 pf., resistor 23 was 100 ohms and the isolation resistance 27 was 2,500 ohms. Frequency range is 1 to 2,500 MHz., response ±0.5 db.

Figure 2:
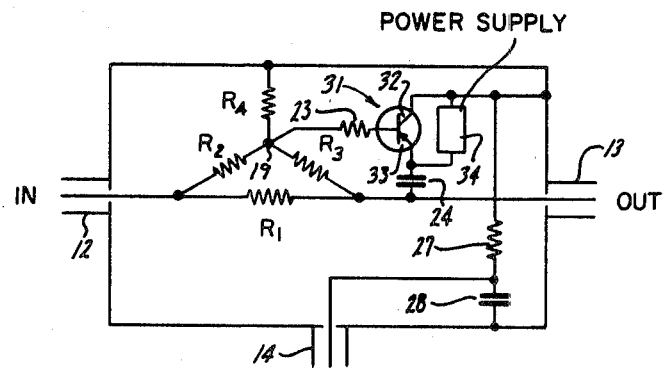
FIG. 2 is another modified embodiment of the frequency independent directional detector of the present invention utilizing a transistor detector.

FIG. 2 illustrates a modified embodiment of the present invention utilizing an active component consisting of a transistor 31 as the detecting element. As shown, the base of the transistor is connected to the common node while the emitter is connected in series with a resistance 23 and DC blocking capacitor 24 to the output terminal node across the diagonal resistance $R_3$. The collector 32 and emitter 33 are connected to a suitable power supply 34 for supplying operating power to the transistor and the collector output is coupled through an isolation resistor 27 to the detector output terminal. By using the transistor gain, the power of output signal can be elevated to a suitable value for driving associated equipment, such as oscilloscopes or meters.

Figure 3:
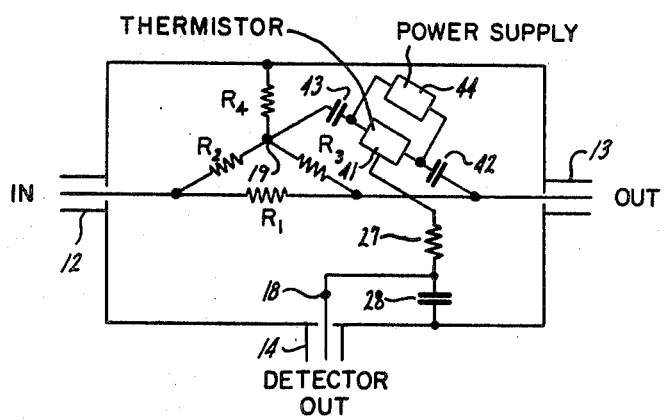
FIG. 3 is a modified embodiment of the frequency independent directional detector utilizing a thermistor detector.

FIG. 3 illustrates another modified embodiment of the present invention in which a thermistor 41 and DC blocking capacitors 42 and 43 replace the diode, and a suitable power supply 44 is in direct parallel connection to the thermistor. Otherwise, the circuit is connected in the same manner as the diode detector of FIG. 1.

Figure 4:
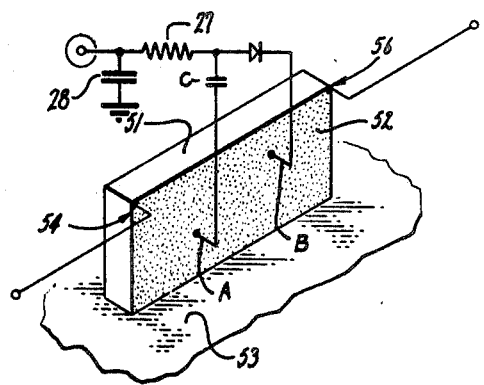
FIG. 4 is a schematic view of a continuous-film directional detector constructed in accordance with the invention.

FIG. 4 shows another embodiment of the invention utilizing continuous film techniques for producing a directional detector for use to very high frequencies. Thus, a ceramic substrate 51 is imprinted with a thin-resistance film 52, such as nichrome. The resistive film is formed in a rectangular shape in which the entire length of one long side is grounded as by being connected to a common conductive bar 53. The corners on the other long side form input and output nodes 54, 56 and are connected to source and load respectively, as in the device of FIG. 1.

Figure 5:
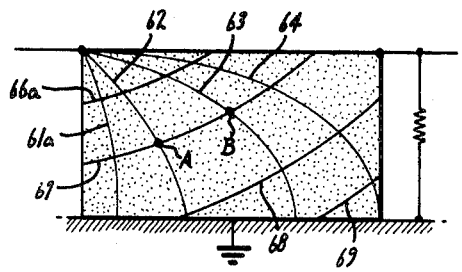
FIGS. 5 and 6 are diagrams of the field lines induced in the detector of FIG. 4.

Referring to FIG. 5, it is seen that a signal is applied from the generator or source side across the node 54 and ground, develop field lines 61 through 64 and equipotential lines 66 through 69 in the film. Thus, if points A and B on the equipotential lines are selected, no voltage will be developed in the external detector circuit connected between these points since they lie on the same equipotential line 67.

Figure 6:
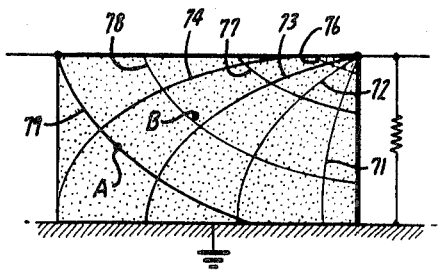

However, if consideration is then given to power reflected from the load back into the device, as illustrated in FIG. 6, it is seen that the field and equipotential lines assume a reverse configuration from that of FIG. 5, as indicated by field lines 71 through 74 and equipotential lines 76 through 79. Points A and B now lie on different equipotentials 78 and 79 so that a voltage is developed in the output detector circuit in direct proportion to the amount of reflected power. The insertion loss of such a continuous lossy medium is controlled by varying the resistance per unit square and also the length of the lossy medium between input and output 54, 56. A long lossy medium would cause high attenuation while a short one would be low attenuation. Also, a low resistance per unit area would correspond to higher insertion losses and high resistance per unit area would correspond to lower insertion losses. Such a circuit has the advantage that it can be printed directly by photographing means onto the ceramic substrate by known techniques. The location of the points A and B are determined by design, but can be determined by probing and making connections accordingly.

Among applications, the frequency independent directional detector of the present invention can be utilized in reflectometry and in leveling and signal sampling applications.

Figure 7:
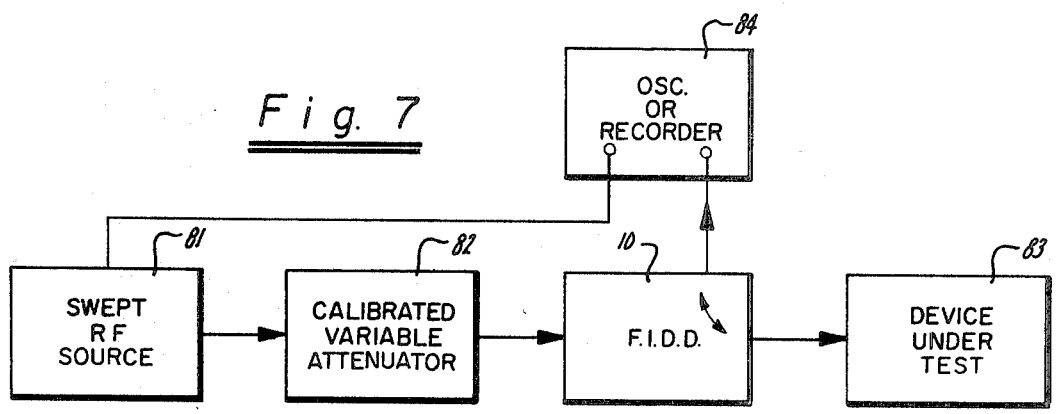
FIG. 7 is a circuit arrangement according to the present invention for using the directional detector as a reflection measurement device.

Referring to FIG. 7, there is shown an arrangement of the use of the detector of the present invention in reflectometry in which a swept RF source 81 is coupled through a variable attenuator 82 connected in series with the detector 10 of the present invention to a device 83 under test. The detector circuit is connected to the vertical input of an oscilloscope 84 or recorder, the horizontal input of which is controlled by source 81. Such a system constitutes a basic reflection system.

Figure 8:
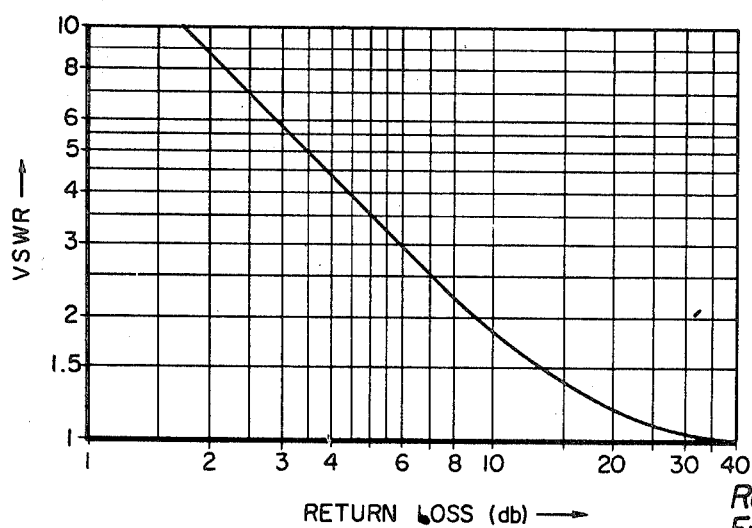
FIG. 8 is a graph of VSWR versus return loss for use with the circuit of FIG. 7.

With an open circuit, (disconnecting the device under test), a set of convenient calibration curves are displayed at various settings of the attenuator 82. The device to be measured is then connected to the output terminal 13 and attenuator 81 is readjusted so the device reflection response is in the range of the calibration lines. The difference between the original and final settings of the attenuator (in db.) is, in fact, the direct return loss of the device under test. Return loss is immediately relatable to VSWR or reflection coefficient by using various available charts such as that shown in FIG. 8. Once calibration has been made, measurements for use in production line testing of devices may be made repeatedly over a wide bandwidth with a single quick measurement.

External leveling of signal sources is another immediate application of the device of the present invention. The detector output voltage is proportional to input RF signal level when the detector is across the diagonal resistor of the input terminal, i.e., when the detector is reversed with respect to load and source connections. A closed loop can then be formed with the circuit-controlling source gain to thereby maintain a feedback path for leveling signal power at a constant value independent of frequency. Because of the ability to reduce the insertion loss of the device to extremely low levels, it is possible to use the device of the present in high-power applications estimated to be of the order of 100-watts average or 500-watts peak while maintaining sufficiently low-insertion losses that detector power dissipation remains less than 1 percent.

We claim:

1. A directional detector including an input terminal having an input node and an output terminal having an output node adapted to be connected to external circuit for passing electromagnetic energy from a source to a load, a bridge resistance $R_1$ connected in series between said input and output terminals, a pair of diagonal resistances $R_2$, $R_3$ having the same impedance as the transmission line impedance and meeting at a common node, the other ends of each of said resistors $R_2$, $R_3$ being connected to said input and output nodes, respectively, a fourth resistance $R_4$ connecting said common node to ground node, resistances $R_1$ and $R_4$ being related by the equation $Z_o^2 = R_1 R_4$, detector output terminal, and a detecting circuit connected in parallel across one of said diagonal resistors and having an output connected to said detector output terminal for providing a signal in proportion to power reflected across the nodes to which said one diagonal resistance is connected such that energy flowing from said source to said load is isolated from said detector output terminal while energy reflected from said load toward said source is detected by the detecting circuit.

2. A directional detector as in claim 1 in which said detecting circuit comprises a diode, one end of which is connected to said common node, a resistance $R_c$ connected in series with the other side of said diode, and a DC isolation capacitor connected in series with said resistor, the other end of said isolation capacitor being connected to the output node.

3. A detector as in claim 2 in which the output of the detecting circuit is taken from the junction between the series resistance $R_c$ and the isolation capacitor and further including isolation resistance connected in series between said junction and said detector output terminal.

4. A directional detector as in claim 1 in which said detecting circuit is a transistor, the base of said transistor being connected to said common node and the emitter of said transistor being connected to said output terminal node, the collector of said transistor serving as an output of the detecting circuit.

5. A directional detector as in claim 1 in which said detecting circuit is a parallel-connected thermistor and power supply and further including DC blocking capacitors connected in the signal path between said thermistor and said common node and between the other side of said thermistor and said output node.

6. A directional detector as in claim 1 in which said first, second, third and fourth resistances comprise a thin film continuous lossy medium disposed on a substrate, the input and common nodes being selected such that they lie on the same equipotential with respect to the field distribution in said medium in response to signals appearing at said input, and the output and common nodes being selected to lie on different equipotentials with respect to the field distribution in said medium in response to signals appearing at said output.

7. A detector as in claim 1 in which the value of $R_1$ has a minimum value less than several ohms and $R_4$ has a value increased correspondingly to thereby provide a detector with a low-insertion loss.